United States Patent
Freeman et al.

(10) Patent No.: US 11,713,694 B1
(45) Date of Patent: Aug. 1, 2023

(54) CERAMIC MATRIX COMPOSITE BLADE TRACK SEGMENT WITH TWO-PIECE CARRIER

(71) Applicant: Rolls-Royce Corporation, Indianapolis, IN (US)

(72) Inventors: Ted J. Freeman, Danville, IN (US); Aaron D. Sippel, Zionsville, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 18/072,145

(22) Filed: Nov. 30, 2022

(51) Int. Cl.
*F01D 25/24* (2006.01)
*F01D 11/08* (2006.01)
*F01D 25/00* (2006.01)

(52) U.S. Cl.
CPC .......... *F01D 25/243* (2013.01); *F01D 11/08* (2013.01); *F01D 25/005* (2013.01); *F01D 25/246* (2013.01); *F05D 2230/60* (2013.01); *F05D 2260/30* (2013.01); *F05D 2300/6033* (2013.01)

(58) Field of Classification Search
CPC ...... F01D 25/243; F01D 11/08; F01D 25/005; F01D 25/246; F05D 2230/60; F05D 2260/30; F05D 2300/6033
See application file for complete search history.

(56) References Cited

U.S. PATENT DOCUMENTS

| | | |
|---|---|---|
| 3,066,911 A | 12/1962 | Frederick, V et al. |
| 3,807,891 A | 4/1974 | McDow et al. |
| 3,880,435 A | 4/1975 | Thornbald |
| 4,676,715 A | 6/1987 | Imbault et al. |
| 4,863,345 A | 9/1989 | Thompson et al. |
| 5,080,557 A | 1/1992 | Berger |
| 5,116,199 A | 5/1992 | Ciokajlo |
| 5,203,673 A | 4/1993 | Evans |
| 5,295,787 A | 3/1994 | Leonard et al. |
| 5,459,995 A | 10/1995 | Norton et al. |
| 5,584,651 A | 12/1996 | Pietraszkiewicz et al. |
| 5,593,276 A | 1/1997 | Proctor et al. |
| 5,609,469 A | 3/1997 | Worley et al. |
| 6,142,731 A | 11/2000 | Dewis et al. |
| 6,821,085 B2 | 11/2004 | Darkins et al. |
| 6,877,952 B2 | 4/2005 | Wilson |
| 6,884,026 B2 | 4/2005 | Glynn et al. |
| 7,210,899 B2 | 5/2007 | Wilson, Jr |
| 7,494,317 B2 | 2/2009 | Keller et al. |
| 7,534,086 B2 | 5/2009 | Mazzola et al. |
| 7,726,936 B2 | 6/2010 | Keller et al. |

(Continued)

FOREIGN PATENT DOCUMENTS

FR        3056636 A1       3/2018

*Primary Examiner* — Hoang M Nguyen
(74) *Attorney, Agent, or Firm* — Barnes & Thornburg LLP

(57) ABSTRACT

A turbine shroud assembly includes a carrier assembly, a blade track segment, and a retainer. The carrier assembly is arranged circumferentially at least partway around an axis and includes a fore carrier segment and an aft carrier segment coupled with the fore carrier. The blade track segment is supported by the carrier assembly to locate the blade track segment radially outward of the axis and define a portion of a gas path of the turbine shroud assembly. The retainer extends into the fore carrier segment, the blade track segment, and the aft carrier segment to couple the blade track segment with the carrier assembly.

20 Claims, 4 Drawing Sheets

(56) References Cited

U.S. PATENT DOCUMENTS

| | | | |
|---|---|---|---|
| 7,753,643 B2 | 7/2010 | Gonzalez et al. |
| 8,128,350 B2 | 3/2012 | Schiavo et al. |
| 8,388,309 B2 | 3/2013 | Marra et al. |
| 8,790,067 B2 | 7/2014 | Mccaffrey et al. |
| 8,905,709 B2 | 12/2014 | Dziech et al. |
| 8,944,756 B2 | 2/2015 | Lagueux |
| 8,979,489 B2 | 3/2015 | Taillant et al. |
| 9,587,504 B2 | 3/2017 | Mccaffrey et al. |
| 9,587,517 B2 | 3/2017 | Vetters et al. |
| 9,863,265 B2 | 1/2018 | Stapleton |
| 9,874,104 B2 | 1/2018 | Shapiro |
| 10,024,193 B2 | 7/2018 | Shapiro |
| 10,030,541 B2 | 7/2018 | Vetters et al. |
| 10,082,039 B2 | 9/2018 | Hanson |
| 10,132,197 B2 | 11/2018 | Heitman et al. |
| 10,174,628 B2 | 1/2019 | Humhauser et al. |
| 10,301,960 B2 | 5/2019 | Stapleton et al. |
| 10,370,991 B2 | 8/2019 | Wilson et al. |
| 10,378,385 B2 | 8/2019 | Tesson et al. |
| 10,378,386 B2 | 8/2019 | Roussille et al. |
| 10,415,426 B2 | 9/2019 | Quennehen et al. |
| 10,415,427 B2 | 9/2019 | Quennehen et al. |
| 10,422,241 B2 | 9/2019 | Mccaffrey et al. |
| 10,428,688 B2 | 10/2019 | Quennehen et al. |
| 10,577,963 B2 | 3/2020 | Mccaffrey |
| 10,590,803 B2 | 3/2020 | Quennehen et al. |
| 10,598,045 B2 | 3/2020 | Tableau et al. |
| 10,605,120 B2 | 3/2020 | Quennehen et al. |
| 10,619,517 B2 | 4/2020 | Quennehen et al. |
| 10,626,745 B2 | 4/2020 | Roussille et al. |
| 10,655,501 B2 | 5/2020 | Lepretre et al. |
| 10,689,998 B2 | 6/2020 | Stapleton et al. |
| 10,690,007 B2 | 6/2020 | Quennehen et al. |
| 10,724,399 B2 | 7/2020 | Carlin et al. |
| 10,753,221 B2 | 8/2020 | Barker et al. |
| 10,787,924 B2 | 9/2020 | Quennehen et al. |
| 10,815,810 B2 | 10/2020 | Barker et al. |
| 10,907,487 B2 | 2/2021 | Zurmehly et al. |
| 10,907,501 B2 | 2/2021 | Filippi et al. |
| 10,934,872 B2 | 3/2021 | Tableau et al. |
| 10,968,761 B2 | 4/2021 | Barker et al. |
| 11,015,613 B2 | 5/2021 | Kerns et al. |
| 11,021,988 B2 | 6/2021 | Tableau et al. |
| 11,021,990 B2 | 6/2021 | Filippi |
| 11,028,720 B2 | 6/2021 | Tableau et al. |
| 11,041,399 B2 | 6/2021 | Lutjen et al. |
| 11,047,245 B2 | 6/2021 | Mccaffrey |
| 11,078,804 B2 | 8/2021 | Tableau et al. |
| 11,085,316 B2 | 8/2021 | Barker et al. |
| 11,085,317 B2 | 8/2021 | Johnson et al. |
| 11,111,822 B2 | 9/2021 | Tableau et al. |
| 11,111,823 B2 | 9/2021 | Jarrossay et al. |
| 11,143,050 B2 | 10/2021 | Roy Thill et al. |
| 11,174,747 B2 | 11/2021 | Roy Thill et al. |
| 11,174,795 B2 | 11/2021 | Lutjen et al. |
| 11,215,064 B2 | 1/2022 | Arbona et al. |
| 11,215,081 B2 | 1/2022 | Schilling et al. |
| 11,255,209 B2 | 2/2022 | Clark et al. |
| 11,286,812 B1 * | 3/2022 | Freeman ............... F01D 25/246 |
| 11,326,470 B2 | 5/2022 | Dyson et al. |
| 11,346,237 B1 * | 5/2022 | Freeman ............... F01D 25/246 |
| 11,365,635 B2 | 6/2022 | Read et al. |
| 11,441,434 B2 | 9/2022 | Danis et al. |
| 11,466,585 B2 | 10/2022 | Arbona et al. |
| 2009/0208284 A1 | 8/2009 | Funnell |
| 2016/0186611 A1 | 6/2016 | Vetters et al. |
| 2016/0186999 A1 | 6/2016 | Freeman et al. |
| 2016/0319688 A1 | 11/2016 | Thibault et al. |
| 2016/0333715 A1 | 11/2016 | Mccaffrey |
| 2016/0348527 A1 * | 12/2016 | Vetters ................. F01D 25/243 |
| 2017/0268366 A1 | 9/2017 | Mccaffrey et al. |
| 2018/0051581 A1 | 2/2018 | Quennehen et al. |
| 2018/0051591 A1 | 2/2018 | Quennehen et al. |
| 2018/0073398 A1 | 3/2018 | Quennehen et al. |
| 2018/0080343 A1 | 3/2018 | Groleau et al. |
| 2018/0156069 A1 | 6/2018 | Quennehen et al. |
| 2018/0291769 A1 | 10/2018 | Vetters et al. |
| 2018/0355761 A1 | 12/2018 | Maar |
| 2019/0040758 A1 | 2/2019 | Quennehen et al. |
| 2019/0040761 A1 | 2/2019 | Carlin et al. |
| 2019/0084892 A1 | 3/2019 | Subramanian et al. |
| 2019/0101027 A1 | 4/2019 | Lepretre et al. |
| 2019/0128132 A1 | 5/2019 | Tableau et al. |
| 2021/0131300 A1 | 5/2021 | Arbona et al. |
| 2021/0172339 A1 * | 6/2021 | Freeman ............... F01D 25/246 |
| 2021/0189909 A1 * | 6/2021 | Sippel .................... F01D 11/08 |
| 2022/0003126 A1 | 1/2022 | Roy Thill et al. |
| 2022/0056809 A1 | 2/2022 | Hock et al. |
| 2022/0120198 A1 | 4/2022 | Schilling et al. |

* cited by examiner

CERAMIC MATRIX COMPOSITE BLADE TRACK SEGMENT WITH TWO-PIECE CARRIER

FIELD OF THE DISCLOSURE

The present disclosure relates generally to gas turbine engines, and more specifically to turbine shroud assemblies adapted for use in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies. Such static shrouds may be coupled to an engine case that surrounds the compressor, the combustor, and the turbine.

Some shrouds positioned in the turbine may be exposed to high temperatures from products of the combustion reaction in the combustor. Such shrouds sometimes include components made from materials that have different coefficients of thermal expansion. Due to the differing coefficients of thermal expansion, the components of some turbine shrouds expand at different rates when exposed to combustion products. In some examples, coupling such components with traditional arrangements may not allow for the differing levels of expansion and contraction during operation of the gas turbine engine.

SUMMARY

The present disclosure may comprise one or more of the following features and combinations thereof.

According to an aspect of the disclosure, a turbine shroud assembly for use with a gas turbine engine includes a carrier assembly, a blade track segment, and a retainer. The carrier assembly may be made of metallic materials and is arranged circumferentially at least partway around an axis. The carrier assembly includes a fore carrier segment and an aft carrier segment coupled with the fore carrier. The fore carrier segment includes a forward outer wall and a forward mount wall that extends radially inward from the forward outer wall. The aft carrier segment includes an aft outer wall, an intermediate mount that includes a first intermediate mount wall that extends radially inward from the aft outer wall and a second intermediate mount wall that extends radially inward from the aft outer wall, and an aft mount wall axially spaced apart from the intermediate mount and that extends radially inward from the aft outer wall.

The blade track segment may be made of ceramic matrix composite materials. The blade track segment is supported by the carrier assembly to locate the blade track segment radially outward of the axis and define a portion of a gas path of the turbine shroud assembly. The blade track segment includes a shroud wall that extends circumferentially partway around the axis, a first attachment flange that extends radially outward from the shroud wall into a forward space between the forward mount wall and the first intermediate mount wall, and a second attachment flange that extends radially outward from the shroud wall into an aft space between the second intermediate mount wall and the aft mount wall.

The retainer includes a forward pin and an aft pin. The forward pin extends through the first attachment flange and into the first intermediate mount wall and the aft pin that extends into the second intermediate mount wall, through the second attachment flange, and into the aft mount wall so as to couple the blade track assembly to the carrier assembly.

In some embodiments, the fore carrier segment further includes an engagement lip that extends axially aft from the forward mount wall and engages the first attachment flange of the blade track segment. In some embodiments, the forward mount wall is formed to include a circumferentially extending channel that opens radially inward. The carrier assembly further includes a seal element located in the channel and engaged with the forward mount wall and the shroud wall.

In some embodiments, the fore carrier segment further includes a hanger arm that extends radially outward away from the fore outer wall and axially so as to be configured to be supported on an outer case of the gas turbine engine. In some embodiments, the forward mount wall is formed to define an axially extending opening sized to receive a portion of the forward pin.

In some embodiments, the aft mount wall includes an aft flange and a chordal seal that extends axially away from the aft flange and engages the second attachment flange. In some embodiments, the forward mount wall and the aft mount wall are spaced apart axially such that the engagement lip and the chordal seal apply an axial compressive force to the first attachment flange and the second attachment flange.

In some embodiments, the forward pin has an aft most end that extends into the first intermediate mount wall and terminates axially forward of the second intermediate mount wall. The aft pin has a fore most end that extends into the second intermediate mount wall and terminates axially aft of the first intermediate mount wall.

According to another aspect of the disclosure, a turbine shroud assembly includes a carrier assembly, a blade track segment, and a retainer. The carrier assembly is arranged circumferentially at least partway around an axis. The carrier assembly includes a fore carrier segment and an aft carrier segment coupled with the fore carrier. The fore carrier segment has a forward outer wall and a forward mount wall that extends radially inward from the forward outer wall. The aft carrier segment has an aft outer wall, an intermediate mount that extends radially inward from the aft outer wall and an aft mount wall axially spaced apart from the intermediate mount and that extends radially inward from the aft outer wall.

The blade track segment is supported by the carrier assembly. The blade track segment includes a shroud wall that extends circumferentially partway around the axis, a first attachment flange that extends radially outward from the shroud wall into a forward space between the forward mount wall and the intermediate mount, and a second attachment flange that extends radially outward from the shroud wall into an aft space between the intermediate mount and the aft mount wall.

The retainer extends into the forward mount wall, the first attachment flange, the intermediate mount, the second attachment flange, and the aft mount wall so as to couple the blade track assembly to the carrier assembly. The forward mount wall may be formed to include a circumferentially extending channel that opens radially inward and the carrier assembly may include a seal element located in the channel and engaged with the forward mount wall and the shroud wall.

In some embodiments, the retainer includes a first pin and a second pin. The first pin extends into the forward mount wall, through the first attachment flange, and into the intermediate mount and a second pin that extends into the intermediate mount, through the second attachment flange, and into the aft mount.

In some embodiments, the intermediate mount includes a first intermediate mount wall and a second intermediate mount wall spaced apart axially from the first intermediate mount wall to form a gap therebetween. In some embodiments, the first pin has an aft most end that extends into the first intermediate mount wall and terminates axially forward of the second intermediate mount wall and the second pin has a fore most end that extends into the second intermediate mount wall and terminates axially aft of the first intermediate mount wall.

In some embodiments, the fore carrier segment further includes an engagement lip that extends axially aft from the forward mount wall and engages the first attachment flange of the blade track segment. In some embodiments, the aft mount wall includes an aft flange and a chordal seal that extends axially away from the aft flange and engages the second attachment flange. In some embodiments, the forward mount wall and the aft mount wall are spaced apart axially such that the engagement lip and the chordal seal apply an axial compressive force to the first attachment flange and the second attachment flange.

In some embodiments, the fore carrier segment further includes a hanger arm that extends radially outward away from the fore outer wall and turns to extend axially. In some embodiments, the retainer includes a pin that extends continuously into the forward mount wall, the first attachment flange, the intermediate mount, the second attachment flange, and the aft mount wall.

According to another aspect of the disclosure, a method may include a number of steps. The method may include providing a carrier assembly including a carrier segment made of metallic materials and arranged circumferentially at least partway around an axis, the carrier segment having a fore carrier segment and an aft carrier segment, the fore carrier segment having a forward outer wall and a forward mount wall that extends radially inward from the forward outer wall, and the aft carrier segment having an aft outer wall, an intermediate mount that extends radially inward from the aft outer wall, and an aft mount wall axially spaced apart from the intermediate mount and that extends radially inward from the aft outer wall, providing a blade track segment made of ceramic matrix composite materials, the blade track segment including a shroud wall that extends circumferentially partway around the axis, a first attachment flange that extends radially outward from the shroud wall, and a second attachment flange that extends radially outward from the shroud wall, inserting a first pin into the aft mount wall, the second attachment flange, and the intermediate mount, inserting a second pin into the intermediate mount and the first attachment flange, and coupling the fore carrier segment with the aft carrier segment such that the second pin extends into the forward mount wall and radially engages the forward mount wall so that radial forces are transmitted from the second pin through the fore carrier segment.

In some embodiments, the fore carrier segment further includes a hook arm that extends radially outward away from the forward outer wall and turns to extend axially. In some embodiments, the method includes applying an axial force from an engagement surface extending axially from the forward mount wall onto the first attachment flange and an axial force from a chordal seal extending axially from the aft mount wall onto the second attachment flange.

These and other features of the present disclosure will become more apparent from the following description of the illustrative embodiments.

DETAILED DESCRIPTION OF THE DRAWINGS

Figure 1:
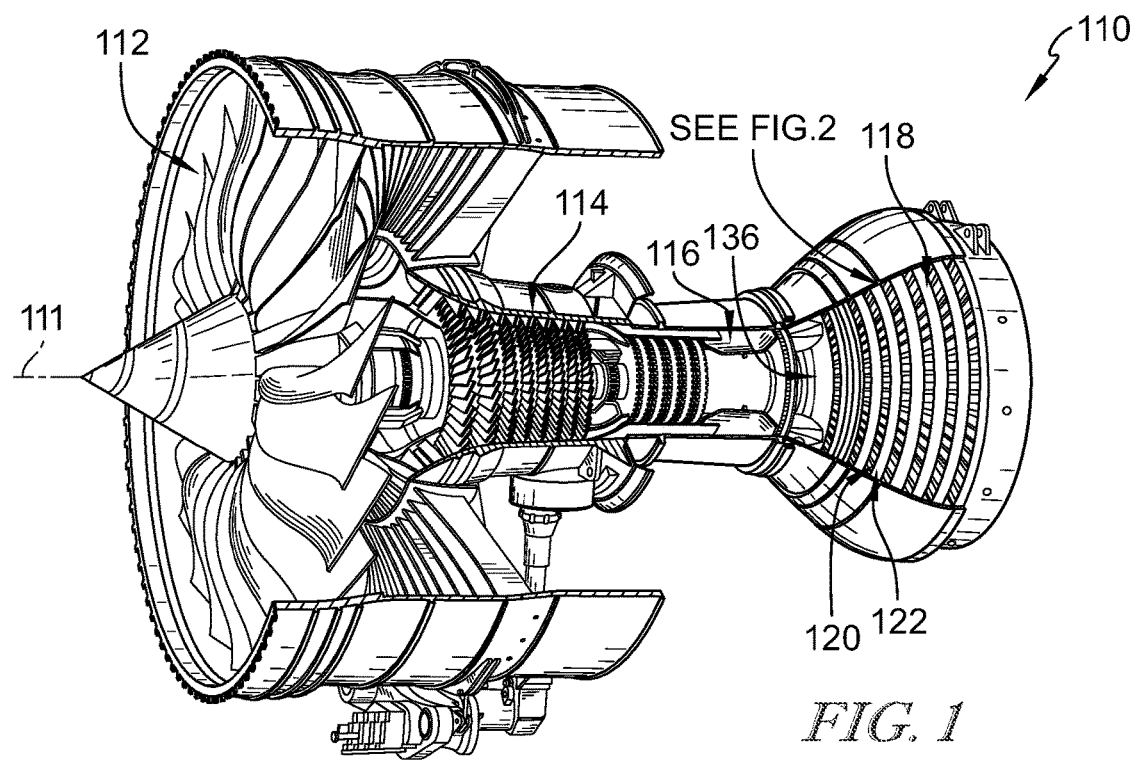
FIG. 1 is a cutaway perspective view of a gas turbine engine that includes a fan, a compressor, a combustor, and a turbine, the turbine includes a turbine shroud assembly that extends circumferentially around an axis and turbine wheels that are driven to rotate about the axis to generate power.

For the purposes of promoting an understanding of the principles of the disclosure, reference will now be made to a number of illustrative embodiments illustrated in the drawings and specific language will be used to describe the same.

An illustrative aerospace gas turbine engine 110 includes a fan 112, a compressor 114, a combustor 116, and a turbine 118 as shown in FIG. 1. The fan 112 is driven by the turbine 118 and provides thrust for propelling an air vehicle. The compressor 114 compresses and delivers air to the combustor 116. The combustor 116 mixes fuel with the compressed air received from the compressor 114 and ignites the fuel. The hot, high-pressure products of the combustion reaction in the combustor 116 are directed into the turbine 118 to cause the turbine 118 to rotate about an axis 111 and drive the compressor 114 and the fan 112. In some embodiments, the fan 112 may be replaced with a propeller, drive shaft, or other suitable configuration.

Figure 2:
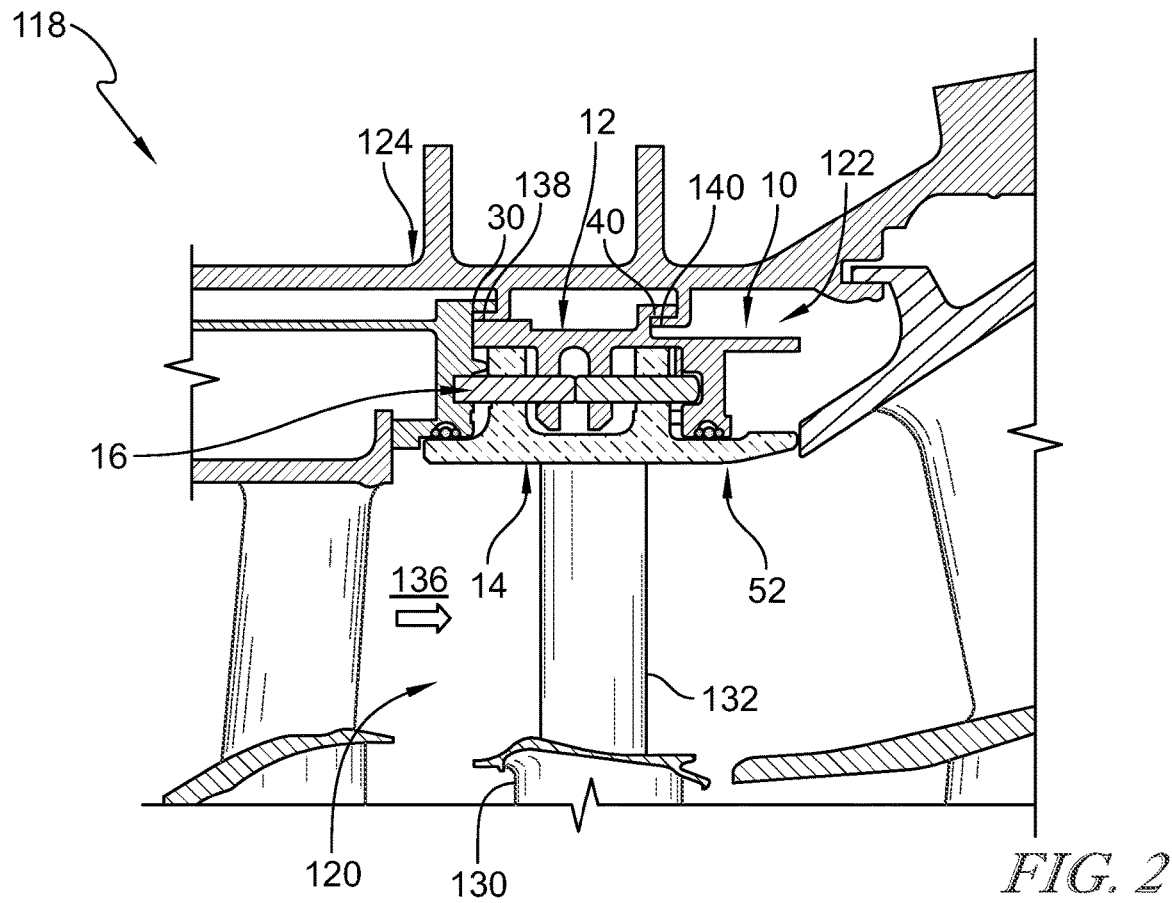
FIG. 2 is a cross-sectional view of a portion of the turbine included in the gas turbine engine of FIG. 1 showing one of the turbine wheel assemblies and the turbine shroud arranged around the turbine wheel assembly, the turbine shroud including a carrier assembly including a fore carrier segment and an aft carrier segment coupled with the fore carrier, a blade track segment supported by the carrier assembly, and a retainer that includes a forward pin and an aft pin to couple the blade track segment to the carrier assembly.

The turbine 118 includes at least one turbine wheel assembly 120 and a turbine shroud 122 positioned to surround the turbine wheel assembly 120 as shown in FIGS. 1 and 2. The turbine wheel assembly 120 includes a plurality of blades 132 coupled to a rotor disk 130 for rotation with the rotor disk 130. The hot, high pressure combustion products from the combustor 116 are directed toward the blades 132 of the turbine wheel assemblies 120 along a flow path 136. The turbine shroud 122 is coupled to an outer case 124 of the gas turbine engine 110 and extends around the turbine wheel assembly 120 to block gases from passing over the turbine blades 132 during use of the turbine 118 in the gas turbine engine 110.

In the illustrative embodiment, the turbine shroud 122 is made up of a number of turbine shroud assemblies 10 that each extend circumferentially partway around the axis 111 and cooperate to surround the turbine wheel assembly 120. In other embodiments, the turbine shroud 122 is annular and non-segmented to extend fully around the central axis 111 and surround the turbine wheel assembly 120. In yet other embodiments, certain components of the turbine shroud 122 are segmented while other components are annular and non-segmented.

Figure 3:
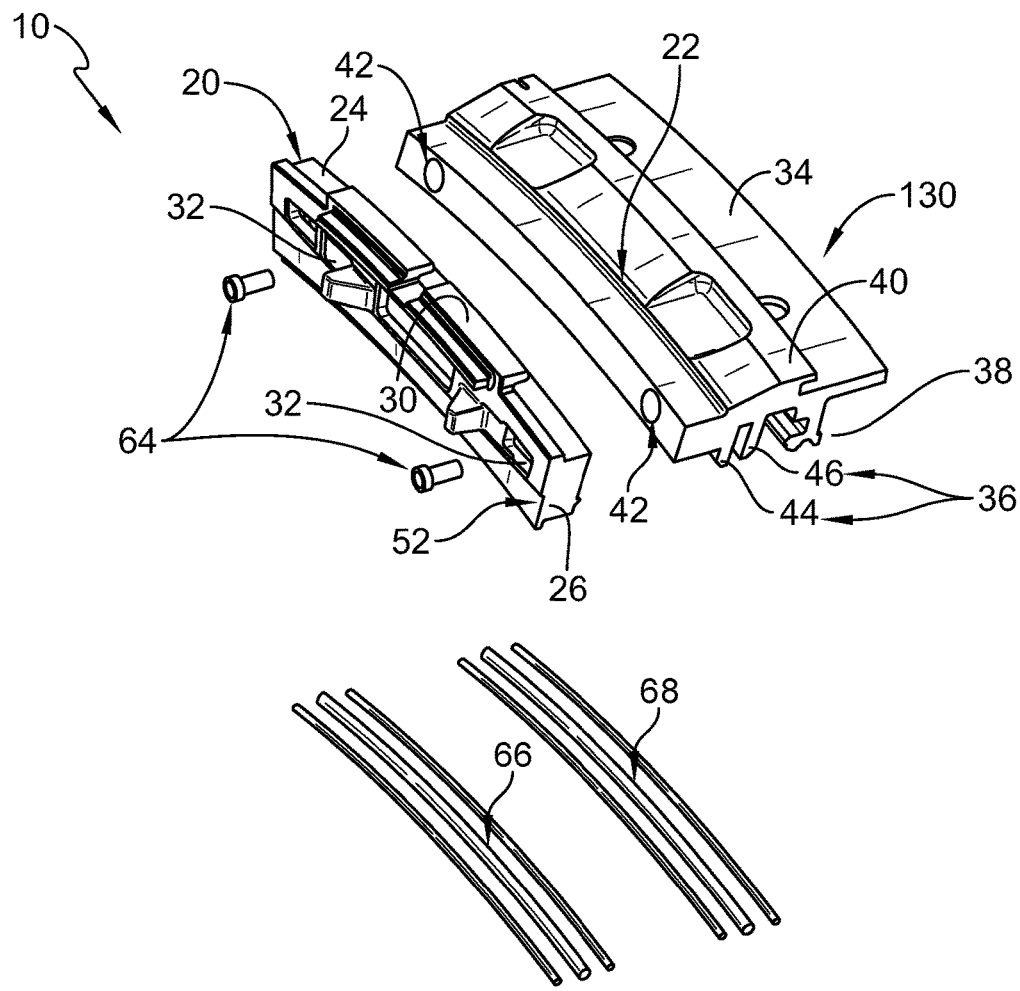
FIG. 3 is an exploded view of the turbine shroud of FIG. 2 showing from top to bottom, the carrier assembly including the fore carrier segment and the aft carrier segment, a plurality of seal elements, the blade track segment, and two retainers that each include a forward pin and an aft pin located axially aft of the forward pin.
Figure 3:
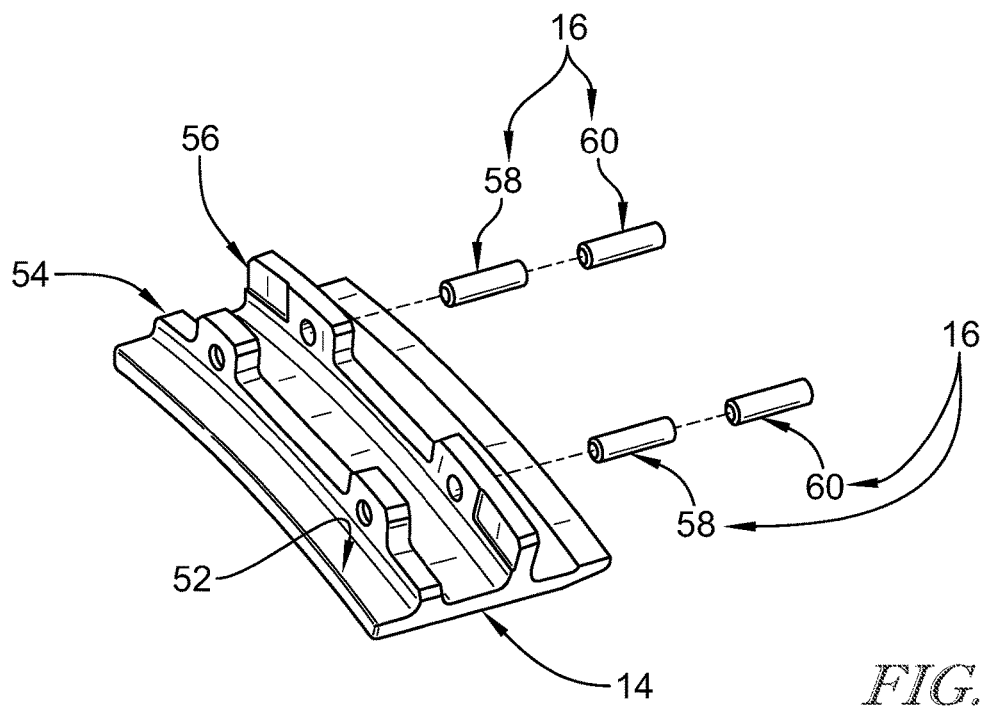
Figure 4:
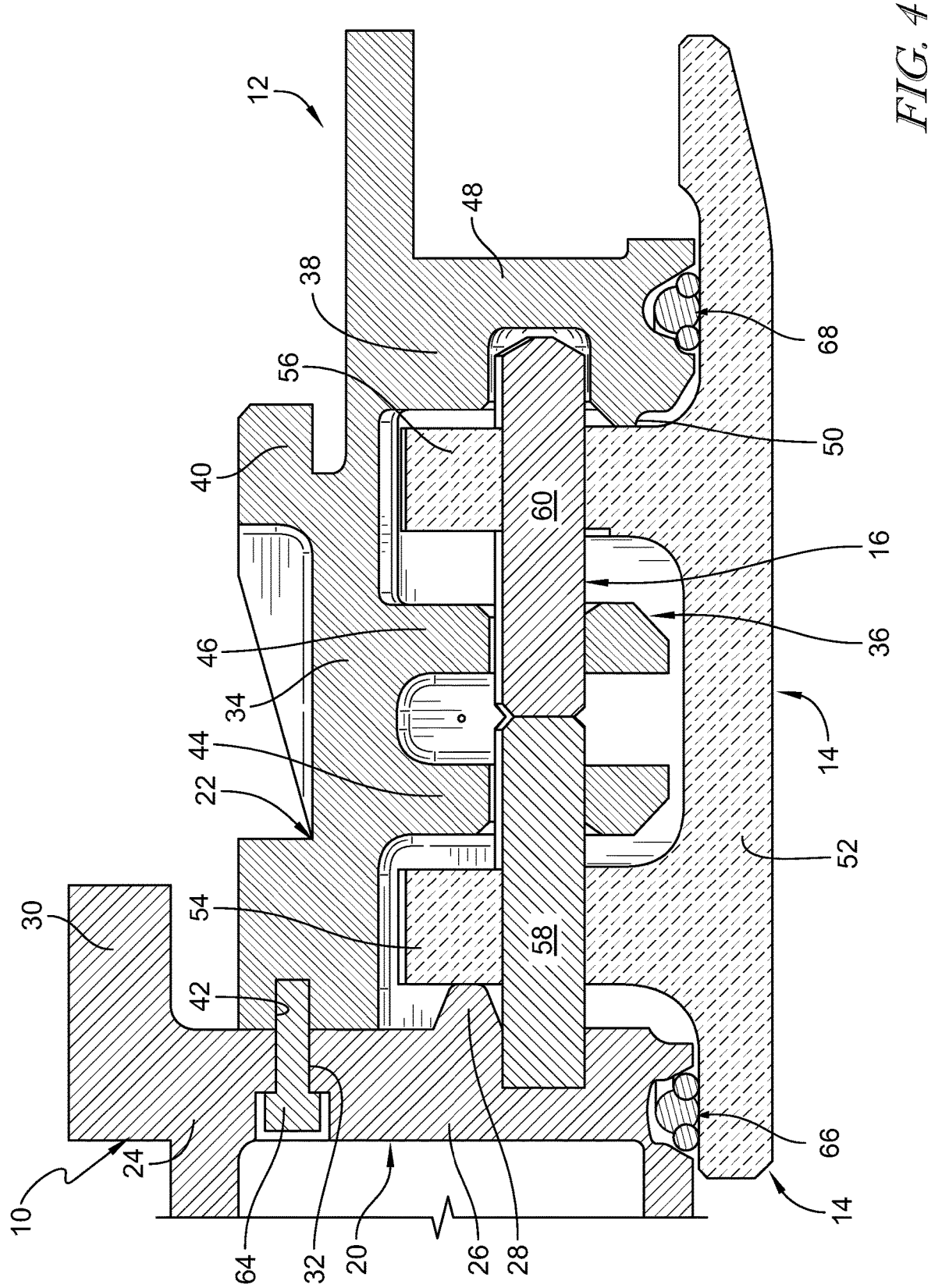
FIG. 4 is detailed cross-section view of the turbine shroud assembly of FIG. 2 showing the carrier assembly, the blade track segment, and one of the retainers, and further showing the carrier assembly includes the fore carrier segment having a forward outer wall and a forward mount wall that extends radially inward from the forward outer wall and the aft carrier segment coupled with the fore carrier segment and having an aft outer wall, an intermediate mount, and an aft mount wall that extends radially inward from the aft outer wall.

Each turbine shroud assembly 10 includes a carrier assembly 12, a blade track segment 14, and at least two retainers 16 as shown in FIGS. 2 and 3. The carrier assembly 12 is made of metallic materials and is arranged circumferentially at least partway around the axis 111, as shown in FIGS. 3 and 4. The carrier assembly 12 couples the blade track segment 14 with the case hanger arms 138, 140 to support the blade track segment 14 radially outside of the plurality of blades 132 of the turbine wheel assembly 120. The blade track segment 14 is supported by the carrier assembly 12 to locate the blade track segment 14 radially outward of the axis 111 and define a portion of the gas path 136. The retainers 16 extend into the carrier assembly 12 and the blade track segment 14 to couple the blade track segment 14 with the carrier assembly 12.

In the illustrative embodiment, the carrier assembly 12 includes a fore carrier segment 20, an aft carrier segment 22 coupled with the fore carrier segment 20, and fasteners 64 for coupling the fore carrier segment 20 and the aft carrier segment 22 together as shown in FIG. 4. The fore carrier segment 20 cooperates with the aft carrier segment 22 to support the blade track segment 14 radially outside the plurality of blades 132 of the turbine wheel assembly 120. The two-piece design of the carrier assembly 12 allows each retainer 16 to be inserted in an axial aft direction into the blade track segment 14 and aft carrier segment 22. The fore carrier segment 20 is then coupled with the aft carrier segment 22 to block the retainers 16 from escaping the assembly.

The fore carrier segment 20 includes a forward outer wall 24, a forward mount wall 26, an engagement lip 28, and a fore hanger arm 30, as shown in FIG. 4. The forward outer wall 24 extends at least partway circumferentially about the axis 111. The forward mount wall 26 extends radially inward from the forward outer wall 24 and is formed to define openings that extend axially into the forward mount wall 26 and each opening is sized to receive a portion of the corresponding retainer 16. The forward mount wall 26 is further formed to include forward fastener holes 32 for receiving fasteners 64 therein. The engagement lip 28 extends axially aft from a portion of the forward mount wall 26 located radially outward from the forward pin 58 and engages with the blade track segment 14 to locate the blade track segment 14 axially relative to the fore carrier segment 20. The fore hanger arm 30 extends radially outward away from the forward outer wall 24 and axially so as to be configured to be supported on the case hanger arms 138, 140 of the turbine section 118.

The aft carrier segment 22 includes an aft outer wall 34, an intermediate mount 36, an aft mount wall 38, and an aft hanger arm 40, as shown in FIGS. 3 and 4. The aft outer wall 34 extends circumferentially at least partway around the axis 111 and is formed to include aft fastener holes 42 for receiving fasteners 64. The intermediate mount 36 and the aft mount wall 38 both extend radially inward from the aft outer wall 34 and are configured to receive at least a portion of the retainers 16 therein. The aft hanger arm 40 extends radially outward away from the aft mount wall 38 and axially, such that when assembled, the fore carrier segment 20 and the aft carrier segment 22 are supported by the case hanger arms 138, 140 of the turbine section 118. The intermediate mount 36 includes a first intermediate mount wall 44 and a second intermediate mount wall 46. The first intermediate mount wall 44 extends radially inward from the aft outer wall 34. The second intermediate mount wall 46 extends radially inward from the aft outer wall 34. The second intermediate mount wall 46 is spaced apart axially from the first intermediate mount wall 44 to form a channel therebetween. In some embodiments, the intermediate mount 36 defines a single wall and does not include two spaced apart walls 44, 46. The intermediate mount 36 may be formed to include air passages that extend radially through the intermediate mount 36. The aft mount wall 38 extends radially inward from the aft outer wall 34 and is axially spaced apart from the intermediate mount 36 as shown in FIG. 4. The fasteners 64 extend into the forward mount wall 26, through the forward fastener hole 32 of the forward mount wall 26 and into the aft fastener hole 42 of the aft outer wall 34.

The aft mount wall 38 includes an aft flange 48 and a chordal seal 50, as shown in FIG. 4. The chordal seal 50 extends axially forward away from the aft flange 48 as well as circumferentially and engages the blade track segment 14 to locate the blade track segment axially relative to the aft flange 48. The chordal seal 50 blocks air flow between the blade track segment 14 and the aft flange 48 and seals off gases flowing along the gas path 128 radially within the blade track segment 14. The aft mount wall 38 is spaced axially apart from the forward mount wall 26 such that the engagement lip 28 and the chordal seal 50 apply an axial compressive force to the blade track segment 14. The chordal seal 50 extends axially away from the aft flange 48.

The blade track segment 14 includes a shroud wall 52, a first attachment flange 54, and a second attachment flange 56, as show in FIGS. 3 and 4. The shroud wall 52 extends circumferentially partway around the axis 111 and prevents gases from passing over the plurality of blades 132 of the turbine wheel assembly 120. The first attachment flange 54 extends radially outward from the shroud wall 52 and into a forward space between the forward mount wall 26 and the first intermediate mount wall 44. The second attachment flange 56 extends radially outward from the shroud wall 52 into an aft space between the second intermediate mount wall 46 and the aft mount wall 38. The fore carrier segment 20 is coupled with the aft carrier segment 22 such that the engagement lip 28 applies an aft force onto the first attachment flange 54. The chordal seal 50 applies a forward force onto the second attachment flange 56 such that the axial compressive force is applied to the blade track segment 14.

The carrier assembly 12 further includes seals 66 and 68 as shown in FIGS. 3 and 4. The seal 66 is located in a channel and engages the shroud wall 52 and the forward carrier segment 20. The seal 68 is located in a channel and engages the shroud wall 52 and the aft carrier segment 22. Each of the seals 66, 68 include a rope seal and a pair of wire seals, one wire seal on each side of the associated rope seal. In other embodiments, seals 66, 68 could include other seal types.

Each retainer 16 includes a forward pin 58 and an aft pin 60 as shown in FIGS. 2, 3 and 4. The forward pin 58 extends into the forward mount wall 26, through the first attachment flange 54, and into the first intermediate mount wall 44. The aft pin 60 extends into the second intermediate mount wall 46, through the second attachment flange 56, and into the aft mount wall 38 so as to couple the blade track segment 14 to the carrier assembly 12. In the illustrative embodiment, the forward pin 58 and the aft pin 60 are in direct confronting relation such that they may abut each other during operation of the gas turbine engine 110. The forward pin 58 and the aft pin 60 are aligned radially and circumferentially. The aft pin 60 is located axially aft of the forward pin 58.

Figure 5:
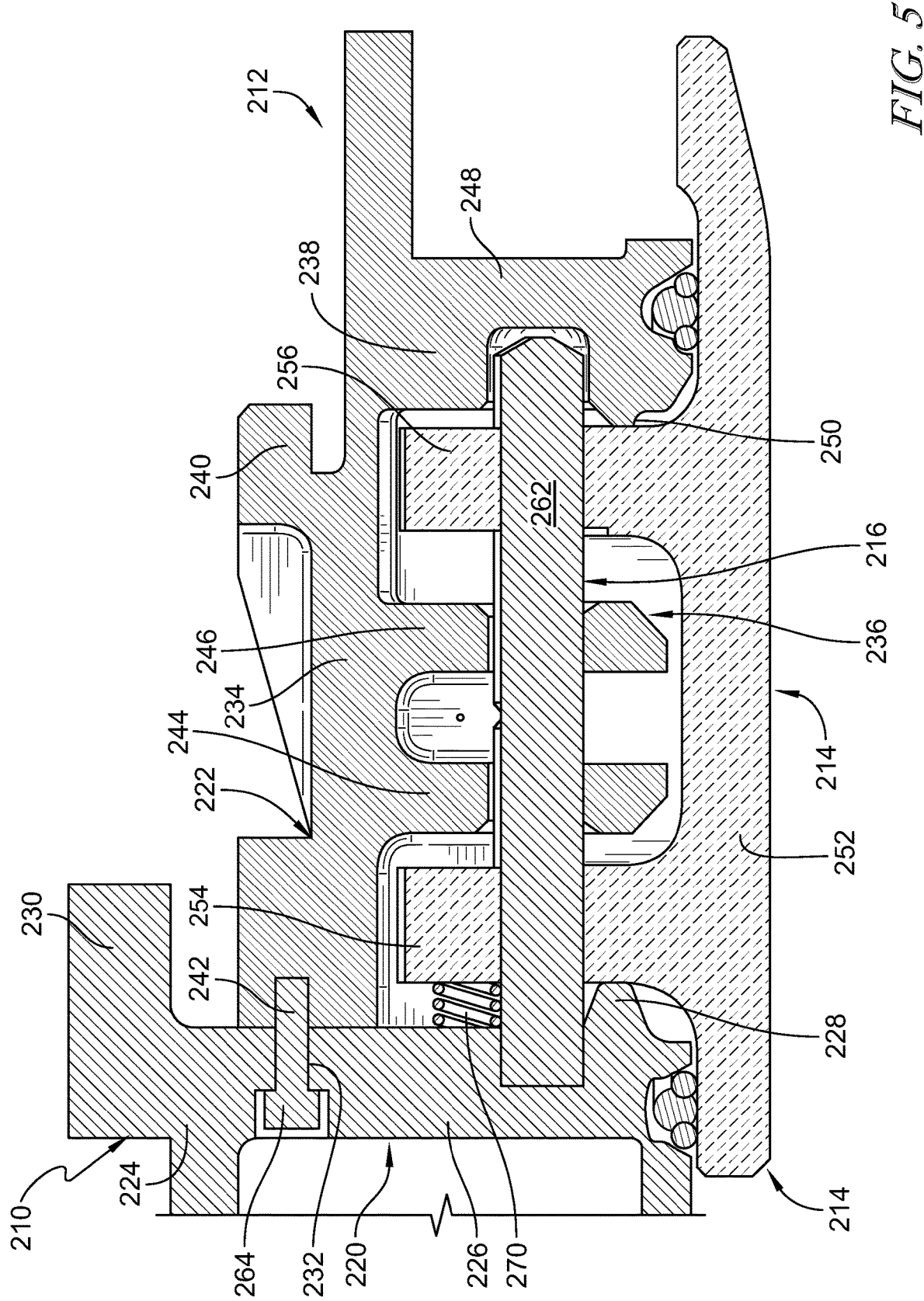
FIG. 5 is detailed cross-section view of another turbine shroud assembly adapted for use in the gas turbine engine of FIG. 1 showing the carrier assembly, the blade track segment, and one of the retainers, wherein the retainer is a single, one-piece pin that extends into the forward mount wall, through attachment flanges of the blade track segment and the intermediate mount wall, and into the aft mount wall.

Another embodiment of a turbine shroud assembly 210 in accordance with the present disclosure is shown in FIG. 5. The turbine shroud assembly 210 is substantially similar to the turbine shroud assembly 10 shown in FIGS. 1-4 and described herein. Accordingly, similar reference numbers in the 200 series indicate features that are common between the turbine shroud assembly 210 and the turbine shroud assembly 10. The description of the turbine shroud assembly 10 is incorporated by reference to apply to the turbine shroud assembly 210, except in instances when it conflicts with the specific description and the drawings of the turbine shroud assembly 210. The turbine shroud assembly 210 includes retainers 216 that each include a single pin as compared to the forward pins 58 and the aft pins 60 of the retainers 16 in the turbine shroud assembly 10.

Each turbine shroud assembly 210 includes a carrier assembly 212, a blade track segment 214, and the retainers 216 as shown in FIG. 5. The carrier assembly 212 extends circumferentially at least partway around the axis 111. The carrier assembly 212 includes a fore carrier segment 220 and an aft carrier segment 222 coupled with the fore carrier segment 220 as shown in FIG. 5. The two-piece design of the carrier assembly 212 allows each retainer 216 to be inserted in an axial aft direction into the blade track segment 214 and aft carrier segment 222. The fore carrier segment 220 is then coupled with the aft carrier segment 222 to block the retainers 216 from escaping the assembly.

In the illustrative embodiment, the turbine shroud assembly 26 further includes a biasing member 270 located axially between the forward mount wall 226 and the first attachment flange 254, as shown in FIG. 5. The biasing member 270 abuts the axially aft facing surface of the forward mount wall 226 and the axially forward facing surface of the first attachment flange 254 such that the biasing member 270 biases the entire blade track segment 214 thereby increasing contact between the second attachment flange 256 and the chordal seal 50.

The fore carrier segment 220 includes a forward outer wall 224, a forward mount wall 226, an engagement lip 228, and a fore hanger arm 230, as shown in FIG. 5. The forward outer wall 224 extends at least partway circumferentially about the axis 111. The forward mount wall 226 extends radially inward from the forward outer wall 224 and is formed to define openings that extend axially into the forward mount wall 226 and each opening is sized to receive a portion of the corresponding retainer 216. The engagement lip 228 extends axially aft from a portion of the forward mount wall 226 located radially inward from the forward pin 58 and engages with the blade track segment 214 to locate the blade track segment 214 axially relative to the fore carrier segment 220. The fore hanger arm 230 extends radially outward away from the forward outer wall 224.

The aft carrier segment 222 includes an aft outer wall 234, an intermediate mount 236, an aft mount wall 238, and an aft hanger arm 240, as shown in FIG. 5. The aft outer wall 234 extends circumferentially at least partway around the axis 111 and is formed to include aft fastener holes 242 for receiving fasteners 264. The intermediate mount 236 and the aft mount wall 238 both extend radially inward from the aft outer wall 234 and are configured to receive at least a portion of the retainers 216 therein. The aft hanger arm 240 extends radially outward away from the aft mount wall 238 and axially, such that when assembled, the fore carrier segment 220 and the aft carrier segment 222 are supported by the case hanger arms 138, 140 of the turbine section 118.

The intermediate mount 236 includes a first intermediate mount wall 244 and a second intermediate mount wall 246. The first intermediate mount wall 244 extends radially inward from the aft outer wall 234. The second intermediate mount wall 246 extends radially inward from the aft outer wall 234. The second intermediate mount wall 246 is spaced apart axially from the first intermediate mount wall 244 to form a channel therebetween. The biasing member 270 may be, for example, a compression spring, braided material, leaf spring, etc.

In some embodiments, the intermediate mount 236 defines a single wall and does not include two spaced apart walls 244, 246. The intermediate mount 236 may be formed to include air passages that extend radially through the intermediate mount 236. The aft mount wall 238 extends radially inward from the aft outer wall 234 and is axially spaced apart from the intermediate mount 236 as shown in FIG. 5. The fasteners 264 extend into the forward mount wall 226, through the fore fastener hole 232 of the forward mount wall 226 and into the aft fastener hole 242 of the aft outer wall 234.

The aft mount wall 238 includes an aft flange 248 and a chordal seal 250, as shown in FIG. 5. The chordal seal 250 extends axially forward away from the aft flange 248 as well as circumferentially. The aft mount wall 238 is spaced axially apart from the forward mount wall. The chordal seal 250 extends axially away from the aft flange 248.

The blade track segment 214 includes a shroud wall 252, a first attachment flange 254, and a second attachment flange 256, as show in FIG. 5. The shroud wall 252 extends circumferentially partway around the axis 111. The first attachment flange 254 extends radially outward from the shroud wall 252 and into a forward space between the forward mount wall 226 and the first intermediate mount wall 244. The second attachment flange 256 extends radially outward from the shroud wall 252 into an aft space between the second intermediate mount wall 246 and the aft mount wall 238.

In this embodiment, each retainer 216 includes a single pin 262 as shown in FIG. 5. The single pin 262 extends from the forward mount wall 226, into the aft mount wall 238, passing through the first and second attachment flanges 254, 256 and through the intermediate mount 236.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine shroud assembly for use with a gas turbine engine, the turbine shroud assembly comprising
    a carrier assembly made of metallic materials and arranged circumferentially at least partway around an axis, the carrier assembly including a fore carrier segment and an aft carrier segment coupled with the fore carrier, the fore carrier segment having a forward outer wall and a forward mount wall that extends radially inward from the forward outer wall, the aft carrier segment having an aft outer wall, an intermediate mount that includes a first intermediate mount wall that extends radially inward from the aft outer wall and a second intermediate mount wall that extends radially inward from the aft outer wall, and an aft mount wall axially spaced apart from the intermediate mount and that extends radially inward from the aft outer wall,
    a blade track segment made of ceramic matrix composite materials, the blade track segment supported by the carrier assembly to locate the blade track segment radially outward of the axis and define a portion of a gas path of the turbine shroud assembly, and the blade track segment including a shroud wall that extends circumferentially partway around the axis, a first attachment flange that extends radially outward from the shroud wall into a forward space between the forward mount wall and the first intermediate mount wall, and a second attachment flange that extends radially outward from the shroud wall into an aft space between the second intermediate mount wall and the aft mount wall, and
    a retainer that includes a forward pin that extends through the first attachment flange and into the first intermediate mount wall and an aft pin that extends into the second intermediate mount wall, through the second attachment flange, and into the aft mount wall so as to couple the blade track assembly to the carrier assembly.

2. The turbine shroud assembly of claim 1, wherein the fore carrier segment further includes an engagement lip that extends axially aft from the forward mount wall and engages the first attachment flange of the blade track segment.

3. The turbine shroud assembly of claim 2, wherein the forward mount wall is formed to include a circumferentially extending channel that opens radially inward and the carrier assembly further includes a seal element located in the channel and engaged with the forward mount wall and the shroud wall.

4. The turbine shroud assembly of claim 2, wherein the fore carrier segment further includes a hanger arm that extends radially outward away from the fore outer wall and axially so as to be configured to be supported on an outer case of the gas turbine engine.

5. The turbine shroud assembly of claim 4, wherein the forward mount wall is formed to define an axially extending opening sized to receive a portion of the forward pin.

6. The turbine shroud assembly of claim 2, wherein the aft mount wall includes an aft flange and a chordal seal that extends axially away from the aft flange and engages the second attachment flange.

7. The turbine shroud assembly of claim 6, wherein the forward mount wall and the aft mount wall are spaced apart axially such that the engagement lip and the chordal seal apply an axial compressive force to the first attachment flange and the second attachment flange.

8. The turbine shroud assembly of claim 1, wherein the forward pin has an aft most end that extends into the first intermediate mount wall and terminates axially forward of the second intermediate mount wall and the aft pin has a fore most end that extends into the second intermediate mount wall and terminates axially aft of the first intermediate mount wall.

9. A turbine shroud assembly for use with a gas turbine engine, the turbine shroud assembly comprising
    a carrier assembly arranged circumferentially at least partway around an axis, the carrier assembly including a fore carrier segment and an aft carrier segment coupled with the fore carrier, the fore carrier segment having a forward outer wall and a forward mount wall that extends radially inward from the forward outer wall, and the aft carrier segment having an aft outer wall, an intermediate mount that extends radially inward from the aft outer wall and an aft mount wall axially spaced apart from the intermediate mount and that extends radially inward from the aft outer wall,
    a blade track segment supported by the carrier assembly, the blade track segment including a shroud wall that extends circumferentially partway around the axis, a first attachment flange that extends radially outward from the shroud wall into a forward space between the forward mount wall and the intermediate mount, and a second attachment flange that extends radially outward from the shroud wall into an aft space between the intermediate mount and the aft mount wall, and
    a retainer that extends into the forward mount wall, the first attachment flange, the intermediate mount, the second attachment flange, and the aft mount wall so as to couple the blade track assembly to the carrier assembly,
    wherein the forward mount wall is formed to include a circumferentially extending channel that opens radially inward and the carrier assembly further includes a seal element located in the channel and engaged with the forward mount wall and the shroud wall.

10. The turbine shroud assembly of claim 9, wherein the retainer includes a first pin that extends into the forward mount wall, through the first attachment flange, and into the intermediate mount and a second pin that extends into the intermediate mount, through the second attachment flange, and into the aft mount.

11. The turbine shroud assembly of claim 10, wherein the intermediate mount includes a first intermediate mount wall and a second intermediate mount wall spaced apart axially from the first intermediate mount wall to form a gap therebetween.

12. The turbine shroud assembly of claim 11, wherein the first pin has an aft most end that extends into the first intermediate mount wall and terminates axially forward of the second intermediate mount wall and the second pin has a fore most end that extends into the second intermediate mount wall and terminates axially aft of the first intermediate mount wall.

13. The turbine shroud assembly of claim 9, wherein the fore carrier segment further includes an engagement lip that extends axially aft from the forward mount wall and engages the first attachment flange of the blade track segment.

14. The turbine shroud assembly of claim 13, wherein the aft mount wall includes an aft flange and a chordal seal that extends axially away from the aft flange and engages the second attachment flange.

15. The turbine shroud assembly of claim 14, wherein the forward mount wall and the aft mount wall are spaced apart axially such that the engagement lip and the chordal seal apply an axial compressive force to the first attachment flange and the second attachment flange.

16. The turbine shroud assembly of claim 9, wherein the fore carrier segment further includes a hanger arm that extends radially outward away from the fore outer wall and turns to extend axially.

17. The turbine shroud assembly of claim 9, wherein the retainer includes a pin that extends continuously into the forward mount wall, the first attachment flange, the intermediate mount, the second attachment flange, and the aft mount wall.

18. A method of forming a turbine shroud assembly, comprising
    providing a carrier assembly including a carrier segment made of metallic materials and arranged circumferentially at least partway around an axis, the carrier segment having a fore carrier segment and an aft carrier segment, the fore carrier segment having a forward outer wall and a forward mount wall that extends radially inward from the forward outer wall, and the aft carrier segment having an aft outer wall, an intermediate mount that extends radially inward from the aft outer wall, and an aft mount wall axially spaced apart from the intermediate mount and that extends radially inward from the aft outer wall,
    providing a blade track segment made of ceramic matrix composite materials, the blade track segment including a shroud wall that extends circumferentially partway around the axis, a first attachment flange that extends radially outward from the shroud wall, and a second attachment flange that extends radially outward from the shroud wall,
    inserting a first pin into the aft mount wall, the second attachment flange, and the intermediate mount,
    inserting a second pin into the intermediate mount and the first attachment flange, and
    coupling the fore carrier segment with the aft carrier segment such that the second pin extends into the forward mount wall and radially engages the forward mount wall so that radial forces are transmitted from the second pin through the fore carrier segment.

19. The method of claim 18, wherein the fore carrier segment further includes a hook arm that extends radially outward away from the forward outer wall and turns to extend axially.

20. The method of claim 19, further comprising applying an axial force from an engagement surface extending axially from the forward mount wall onto the first attachment flange and an axial force from a chordal seal extending axially from the aft mount wall onto the second attachment flange.

\* \* \* \* \*